(12) United States Patent
Oh (10) Patent No.: US 11,053,985 B2
(45) Date of Patent: Jul. 6, 2021

(54) DIRECT PINION MOUNT CONSTANT VELOCITY JOINT

(71) Applicant: DANA AUTOMOTIVE SYSTEMS GROUP, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 430 days.

(21) Appl. No.: 16/076,528

(22) PCT Filed: Feb. 10, 2017

(86) PCT No.: PCT/US2017/017377
§ 371 (c)(1),
(2) Date: Aug. 8, 2018

(87) PCT Pub. No.: WO2017/139581
PCT Pub. Date: Aug. 17, 2017

(65) Prior Publication Data
US 2019/0040916 A1    Feb. 7, 2019

Related U.S. Application Data

(60) Provisional application No. 62/293,384, filed on Feb. 10, 2016.

(51) Int. Cl.
*F16D 3/224* (2011.01)
*F16D 1/116* (2006.01)
(Continued)

(52) U.S. Cl.
CPC .............. *F16D 3/224* (2013.01); *F16D 1/116* (2013.01); *F16D 3/845* (2013.01);
(Continued)

(58) Field of Classification Search
CPC .......... F16D 3/224; F16D 1/116; F16D 3/845; F16D 2003/22326; F16D 2003/22303;
(Continued)

(56) References Cited

U.S. PATENT DOCUMENTS 1,980,846 A     11/1934  Bradley
2,325,460 A *   7/1943   Amberg .................. F16D 3/224
                                                         464/145
(Continued)

FOREIGN PATENT DOCUMENTS

CN     1414257 A      4/2003
CN     102741578 A    10/2012
(Continued)

OTHER PUBLICATIONS

Universal Joint and Driveshaft Design Manual, AE-7, Society of Automotive Engineers, Inc., Warrendale, PA, pp. 145-150, TJ1079. S62. (Year: 1979).*
European Patent Office, International Search Report with Written Opinion issued in Application PCT/US2017/031933, dated Sep. 12, 2017, 11 pages, European Patent Office, Rijswijk, Netherlands.
European Patent Office, International Search Report with Written Opinion issued in PCT/US2018/025200, dated Jul. 25, 2018, 13 pages, Rijswijk, Netherlands.
(Continued)

*Primary Examiner* — Greg Binda
(74) *Attorney, Agent, or Firm* — Marshall & Melhorn, LLC (57) ABSTRACT

A joint assembly for a motor vehicle. The joint includes an inner race, an outer race, a plurality of balls and a cage. The inner race is drivingly connected to a sleeve having an axially inboard portion, an intermediate portion and an axially outboard portion. Circumferentially extending from the intermediate portion of the sleeve is an abutment portion. At least a portion of the abutment portion is in direct contact with an end of the inner race. Axially outboard from the abutment portion is a stepped portion. A shaft is drivingly connected to an inner surface of a hollow interior portion of the axially outboard portion of the sleeve. A first end portion of a boot is connected to an outer surface of the outer race
(Continued)

and a second end portion of the boot is connected to an outer surface of the axially outboard portion of the sleeve.

14 Claims, 5 Drawing Sheets

(51) Int. Cl.
  *F16D 3/84* (2006.01)
  *F16D 3/223* (2011.01)
(52) U.S. Cl.
  CPC .............. *F16D 2003/22303* (2013.01); *F16D 2003/22313* (2013.01); *F16D 2003/22326* (2013.01); *Y10S 464/906* (2013.01)
(58) Field of Classification Search
  CPC .... F16D 2003/22313; F16D 3/18; F16D 3/84; F16D 3/22; Y10S 464/906; F16C 11/06
  USPC .................................................. 464/145, 175
  See application file for complete search history.

(56) References Cited

U.S. PATENT DOCUMENTS

| | | |
|---|---|---|
| 2,653,456 A | 9/1953 | Heym |
| 2,844,013 A | 7/1958 | Spence |
| 3,162,026 A | 11/1964 | Ritsema |
| 3,162,024 A | 12/1964 | Breuer |
| 3,176,476 A | 4/1965 | Cull |
| 3,186,189 A | 6/1965 | Cull |
| 3,452,558 A | 7/1969 | Cull |
| 3,464,232 A | 9/1969 | Hutchinson |
| 3,540,232 A | 11/1970 | Breuer |
| 3,789,624 A | 2/1974 | Camosso |
| 3,802,221 A | 4/1974 | Kimata |
| 3,858,412 A | 1/1975 | Fisher |
| 4,034,576 A | 7/1977 | Takahashi |
| 4,112,709 A | 9/1978 | Krude |
| 4,191,031 A | 3/1980 | Girguis |
| 4,196,598 A | 4/1980 | Hirai |
| 4,205,925 A | 6/1980 | Fisher |
| 4,229,952 A | 10/1980 | Aucktor |
| 4,249,395 A | 2/1981 | Harz |
| 4,319,467 A | 3/1982 | Hegler |
| 4,320,632 A | 3/1982 | Dore |
| 4,369,979 A | 1/1983 | Krude |
| 4,392,838 A | 7/1983 | Welschof |
| 4,395,247 A | 7/1983 | Roberts |
| 4,403,781 A | 9/1983 | Riemscheid |
| 4,411,549 A | 10/1983 | Sheppard |
| 4,437,782 A | 3/1984 | Geisthoff |
| 4,540,385 A | 9/1985 | Krude |
| 4,558,869 A | 12/1985 | Grove |
| 4,669,571 A | 6/1987 | Kurde |
| 4,805,921 A | 2/1989 | Ukai |
| 4,877,103 A | 10/1989 | Nuutio |
| 4,967,609 A | 11/1990 | Takagi |
| 5,201,107 A | 4/1993 | Mazziotti |
| 5,222,914 A | 6/1993 | Mazziotti |
| 5,236,394 A | 8/1993 | Collins |
| 5,318,480 A | 6/1994 | Essi |
| 5,376,052 A | 12/1994 | Jacob |
| 5,529,538 A | 6/1996 | Schulz |
| 5,580,313 A | 12/1996 | Jacob |
| 5,954,587 A * | 9/1999 | Jacob .................... F16D 3/2237 464/145 |
| 6,010,409 A | 1/2000 | Johnson |
| 6,085,797 A | 7/2000 | Grabaum |
| 6,251,021 B1 | 6/2001 | Jacob |
| 6,390,926 B1 | 5/2002 | Perrow |
| 6,482,094 B2 | 11/2002 | Kefes |
| 6,530,843 B2 | 3/2003 | Miller |
| 6,540,616 B2 | 4/2003 | Miller |
| 6,582,151 B2 | 6/2003 | Hopson |
| 6,585,601 B2 | 7/2003 | Booker |
| 6,709,338 B2 | 3/2004 | Weckerling |
| 6,780,114 B2 | 8/2004 | Sahashi |
| 6,793,581 B2 | 9/2004 | Meyer |
| 6,793,584 B2 | 9/2004 | Ramey |
| 6,926,612 B2 | 8/2005 | Wang |
| 6,988,949 B2 | 1/2006 | Wang |
| 7,008,325 B2 | 3/2006 | Bongartz |
| 7,077,753 B2 | 7/2006 | Kuczera |
| 7,097,563 B2 | 8/2006 | Benson |
| 7,104,893 B2 | 9/2006 | Ouchi |
| 7,204,760 B2 | 4/2007 | Wang |
| 7,226,360 B2 | 6/2007 | Lyon |
| 7,232,373 B2 | 6/2007 | Hildebrandt |
| 7,238,114 B2 | 7/2007 | Wang |
| 7,281,984 B2 | 10/2007 | Foster-Hamilton |
| 7,326,199 B2 | 2/2008 | MacFarland |
| 7,377,854 B2 | 5/2008 | Wormsbaecher |
| 7,396,286 B2 | 7/2008 | Sueoka |
| 7,435,182 B2 | 10/2008 | Ichikawa |
| 7,488,259 B2 | 2/2009 | Sueoka |
| 7,575,519 B2 | 8/2009 | Dice |
| 7,607,984 B2 | 10/2009 | Hopson |
| 7,607,985 B2 | 10/2009 | Krude |
| 7,677,984 B2 | 3/2010 | Hahn |
| 7,704,149 B2 | 4/2010 | Yamazaki |
| 7,997,988 B2 | 8/2011 | Wormsbaecher |
| 8,025,579 B2 | 9/2011 | Kamikawa |
| 8,033,920 B1 | 10/2011 | Benson |
| 8,070,613 B2 | 12/2011 | Cermak |
| 8,157,660 B2 | 4/2012 | Disser |
| 8,162,767 B2 | 4/2012 | Holzhei |
| 8,172,691 B2 | 5/2012 | Deisinger |
| 8,235,829 B2 | 8/2012 | Kozlowski |
| 8,262,488 B2 | 9/2012 | Takemura |
| 8,262,489 B2 | 9/2012 | Valovick |
| 8,262,490 B2 | 9/2012 | Langer |
| 8,287,393 B2 | 10/2012 | Dao |
| 8,322,941 B2 | 12/2012 | Cermak |
| 8,342,972 B2 | 1/2013 | Yamazaki |
| 8,353,775 B2 | 1/2013 | Kamikawa |
| 8,371,949 B2 | 2/2013 | Patterson |
| 8,425,142 B2 | 4/2013 | Disser |
| 8,435,125 B2 | 5/2013 | Ooba |
| 8,469,829 B2 | 6/2013 | Kobayashi |
| 8,475,286 B2 | 7/2013 | Lamothe |
| 8,641,538 B2 | 2/2014 | Oh |
| 8,834,279 B2 | 9/2014 | Oh |
| 9,133,888 B2 | 9/2015 | Gremmelmaier |
| 9,284,990 B2 * | 3/2016 | Oh ........................... F16D 3/18 |
| 9,388,860 B2 | 7/2016 | Berube |
| 9,670,963 B2 | 6/2017 | Metzger |
| 2001/0016520 A1 | 8/2001 | Sahashi |
| 2001/0046901 A1 | 11/2001 | Meyer |
| 2003/0069075 A1 | 4/2003 | Furuta |
| 2003/0083135 A1 | 5/2003 | Yamazaki |
| 2003/0146591 A1 | 8/2003 | Ouchi |
| 2005/0192107 A1 | 9/2005 | Toriumi |
| 2007/0149298 A1 | 6/2007 | Wormsbaecher |
| 2007/0225081 A1 | 9/2007 | Toriumi |
| 2008/0234057 A1 | 9/2008 | Takekawa |
| 2010/0124995 A1 | 5/2010 | Disser |
| 2010/0249949 A1 | 9/2010 | Bjarnason |
| 2010/0267455 A1 | 10/2010 | Valovick |
| 2012/0004044 A1 | 1/2012 | Conger |
| 2013/0244798 A1 | 9/2013 | Oh |
| 2016/0017929 A1 | 1/2016 | Sugiyama |
| 2017/0292570 A1 | 10/2017 | Ketchel |

FOREIGN PATENT DOCUMENTS

| | | |
|---|---|---|
| DE | 2703467 | 8/1978 |
| DE | 2801114 | 6/1979 |
| DE | 102010031841 A1 | 3/2012 |
| EP | 2086180 | 8/2009 |
| EP | 2123926 | 11/2009 |
| EP | 2806180 A2 | 11/2014 |
| EP | 2912329 B1 | 12/2016 |
| FR | 2674299 | 9/1992 |

(56) References Cited

FOREIGN PATENT DOCUMENTS

| | | |
|---|---|---|
| FR | 2899660 | 10/2007 |
| GB | 503835 | 4/1939 |
| GB | 2000573 | 1/1979 |
| GB | 2017256 A | 10/1979 |
| GB | 2323641 | 9/1998 |
| JP | 2004232836 | 8/2004 |
| NL | 301618 A | 10/1965 |
| WO | 9306379 | 4/1993 |
| WO | 2015077679 | 5/2015 |
| WO | 2015153431 | 10/2015 |
| WO | 2017051746 | 3/2017 |
| WO | 2017196962 | 11/2017 |

OTHER PUBLICATIONS

European Patent Office, The International Search Report and Written Opinion issued in PCT/US2014/070499, Aug. 20, 2015, 10 pages, European Patent Office, Rijswijk, Netherlands.
The State Intellectual Property Office of the People's Republic of China, Chinese Office Action with Search Report for Application No. 201580025387.9, dated Jun. 28, 2018, 13 pages.
International Search Report and Written Opinion for Application No. PCT/US2015/023295, dated Oct. 15, 2015, issued by the European Patent Office. (12 pages).
European Patent Office, The International Search Report and Written Opinion issued in PCT/US2017/017377, dated May 9, 2017, 15 pages, European Patent Office, Rijswijk, Netherlands.

\* cited by examiner

DIRECT PINION MOUNT CONSTANT VELOCITY JOINT

CROSS REFERENCE TO RELATED APPLICATIONS

The present application claims the benefit to U.S. Provisional Patent Application No. 62/293,384 filed on Feb. 10, 2016, which is incorporated herein by reference in its entirety.

FIELD OF THE DISCLOSURE

The present disclosure relates to a direct pinion mount constant velocity joint. More particularly, the present disclosure relates to a direct pinion mount high speed constant velocity joint with a boot for a propeller shaft.

BACKGROUND OF THE DISCLOSURE

Figure 1:
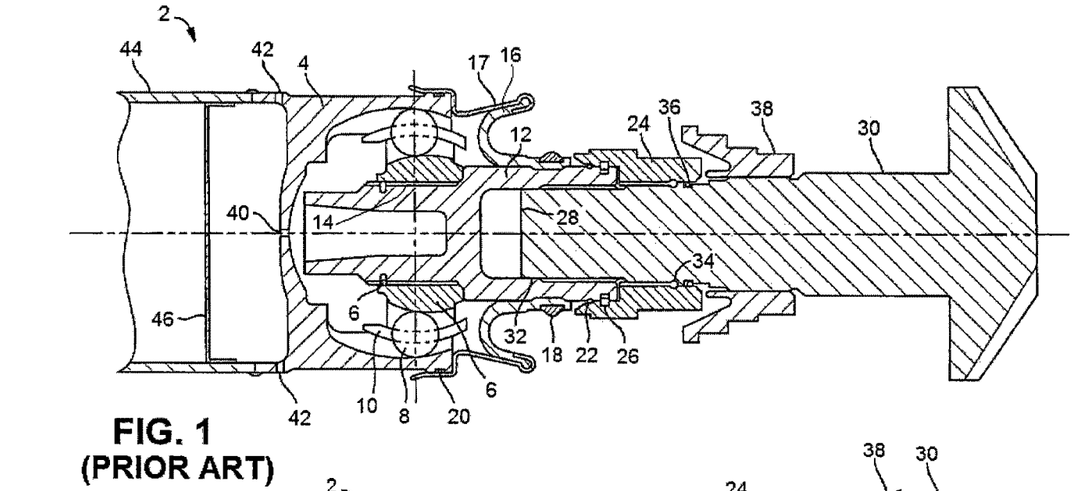
FIG. 1 is a cut-away schematic side-view of a prior art direct pinion mount constant velocity joint for a propeller shaft.

Direct pinion mount constant velocity joints are known. A conventional direct pinion mount constant velocity joint is illustrated in FIG. 1 of the disclosure.

The joint 2 has an outer race 4, an inner race 6, a plurality of balls 8 in contact with the inner and outer races 6 and 4 and a cage 10 to retain the balls 8. Additionally, joint 2 has a sleeve 12 that is rotationally connected to the inner race 6. The sleeve 12 is rotationally connected to the inner race 6 via a plurality of mating splines 14 on the inner race 6 and the sleeve 12. The sleeve 12 is axially retained by a snap ring 6.

A boot 16 is attached to the sleeve 12 by using a clamp 18. Additionally, the boot 16 is attached to the outer race 4 of the joint 2 by using a boot can 17. An O-ring 20 is located between the outer race 4 and the boot 16 to create a seal between the two. Interposed between the sleeve 12 and the nut 24 is an O-ring 22 to create a seal between the sleeve 12 and the nut 24. A snap ring 26 axially retains the sleeve 12 with respect to the nut 24. In addition, a set of threads rotationally connect the sleeve 12 with the nut 24.

A cylinder portion 28, at the end of a pinion shaft 30, is located in a pilot 32 of the sleeve 12. In order to axially retain the pinion shaft 30 and the nut 24 together, a snap ring 34 is placed between the pinion shaft 30 to the nut 24. An O-ring 36 is located between the pinion shaft 30 and the nut 24 to create a seal between the two.

A lock nut 38 is threaded onto an outer surface of the pinion shaft 30. The lock nut 38 prevents nut 24 from becoming axially loose.

A vent hole 40 is located in the outer race 4. Two additional vent holes 42 are located in a tube portion 44 of the outer race 4 to let air escape from the joint 2 to atmosphere. A plug 46 is provided in the tube portion 44 of the outer race 4 to prevent the inside of the tube 44 from communicating with the joint 2.

Figure 2:
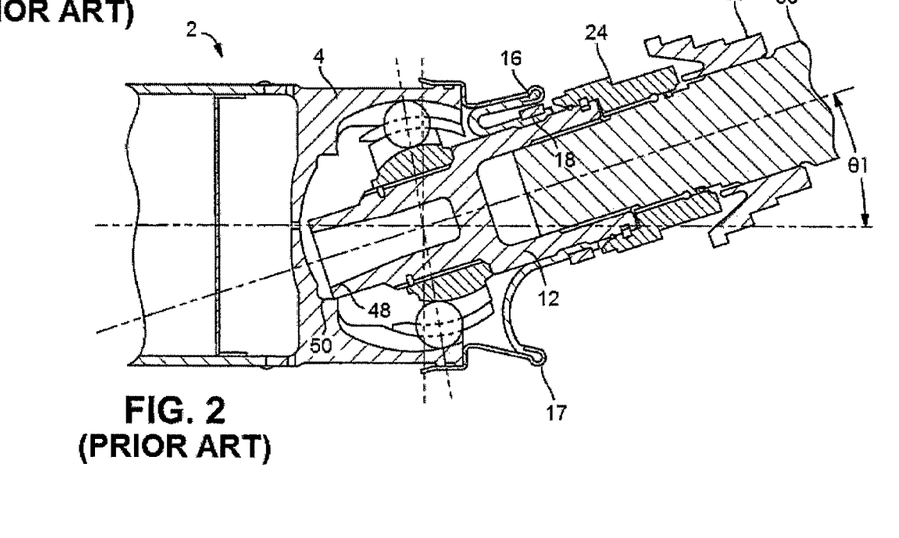
FIG. 2 is a cut-away schematic side-view of the prior art constant velocity joint illustrated in FIG. 1 at a maximum joint angle.

As illustrated in FIG. 2 of the disclosure, an end portion 48 on the stem of the sleeve 12 is designed to contact a stopper 50 formed in the outer race 4 of the joint 2 when the joint 2 is at a maximum joint angle θ1 in order to prevent damage to the boot 16.

The end portion 48 of the sleeve 12 is made longer so that the end portion 48 of the sleeve 12 will make contact with stopper 50 of the joint 2 when articulated to the maximum angle θ1. The increased length of the end portion 48 of the sleeve 12 requires more material, which disadvantageously increases the overall weight and cost of the sleeve 12.

The prior art joint 2 illustrated in FIGS. 1 and 2 of the disclosure has an additional disadvantage. Namely, the conventional boot 16 is constructed of a rubber or other similar material, which is not robust enough to sustain the internal lubricant and air pressures that are generated by the joint 2 when in operation. As a result, an air vent system, comprising the plug 46 and the holes 40 and 42 must be used to reduce the amount of lubricant and air pressures within the joint 2 when in operation. The plug 46 and the holes 40 and 42 disadvantageously increase the overall production time and cost associated with the joint 2.

Yet another disadvantage associated with the design of joint 2 illustrated in FIGS. 1 and 2 of the disclosure is that the pinion shaft 30 can disengage from the sleeve 12 if the axial strength of the snap ring 26 is not sufficient. If the snap ring 26 fails, the joint 2 could fail resulting in no power transmission and/or may cause damage to the vehicle.

Finally, as illustrated in FIG. 2 of the disclosure, the joint 2 has a relatively low maximum joint angle θ1. The maximum joint angle θ1 is determined by the size of the boot can 17 and the clamp 18. Namely, the boot can 17 and the clamp 18 come in contact with one another when the joint 2 is articulated to its maximum angle θ1. The contact of the boot can 17 and the clamp 18 prevents the joint 2 from extending at a greater angle. The relatively low maximum joint angle θ1 of the joint 2 limits the overall operability and usefulness of the joint 2 to only certain applications.

SUMMARY OF THE DISCLOSURE

A joint assembly for use in a motor vehicle. The joint comprises an inner race, an outer race, a plurality of balls and a cage that is disposed between the inner race and the outer race of the joint. Extending along at least a portion of an inner surface of the inner race has a plurality of axially extending circumferential splines. The plurality of axially extending circumferential splines on the inner surface of the inner race are meshingly engaged with a plurality of axially extending splines circumferentially extending along at least a portion of an outer surface of an axially inboard portion of a sleeve.

Circumferentially extending from at least a portion of an intermediate portion of the sleeve is an abutment portion. At least a portion of the abutment portion on the intermediate portion of the sleeve is in direct contact with an end of the inner race of the joint.

A stepped portion is disposed axially outboard from and adjacent to the abutment portion on the intermediate portion of the sleeve. The stepped portion of the sleeve has an outer diameter that is smaller than an outer diameter of the of the abutment portion on the intermediate portion of the sleeve.

An axially outboard portion of the sleeve has an inner surface and an outer surface defining a hollow interior portion. The outer surface of the axially outboard portion of the sleeve is has an outermost diameter that is larger than the outer diameter of the stepped portion of the sleeve. Additionally, the outermost diameter of the axially outboard portion of the sleeve is smaller than the outer diameter of the abutment portion on the intermediate portion of the sleeve. The inner surface has a plurality of axially extending circumferential splines. The plurality of axially extending circumferential splines on the inner surface of the hollow interior portion of the axially outboard portion of the sleeve are complementary to and meshingly engaged with a plurality of axially extending circumferential splines on an outer surface of a shaft.

Disposed radially outboard from the sleeve is a boot having a first end portion, an intermediate portion and a second end portion. At least a portion of the first end portion of the boot is connected to an outer surface of the outer race and at least a portion of the second end portion of the boot is connected to an outer surface of the axially outboard portion of the sleeve.

BRIEF DESCRIPTION OF THE DRAWINGS

The above, as well as other advantages of the present disclosure, will become readily apparent to those skilled in the art from the following detailed description when considered in the light of the accompanying drawings in which.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the joint disclosed herein may be used in automotive, off-road vehicle, all-terrain vehicle, construction, structural, marine, aerospace, locomotive, military, machinery, robotic and/or consumer product applications. Additionally, as a non-limiting example, the joint disclosed herein may also be used in passenger vehicle, electric vehicle, hybrid vehicle, commercial vehicle, autonomous vehicles, semi-autonomous vehicles and/or heavy vehicle applications.

FIGS. 3-6 are a cut-away schematic side view of a joint 100 according to an embodiment of the disclosure. As illustrated in FIGS. 3-6 of the disclosure, the joint 100 has an outer race 102, an inner race 104, a plurality of balls 106 and a cage 108 containing the plurality balls 106. As a non-limiting example, the joint 100 is a direct pinion mount constant velocity joint.

Figure 3:
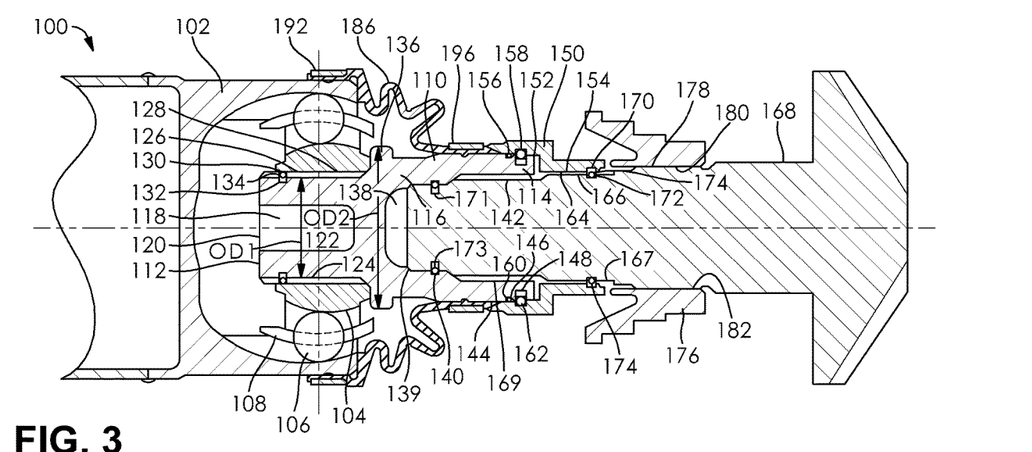
FIG. 3 is a cut-away schematic side-view of a direct pinion mount fixed joint for a propeller shaft according to an embodiment of the disclosure.
Figure 4:
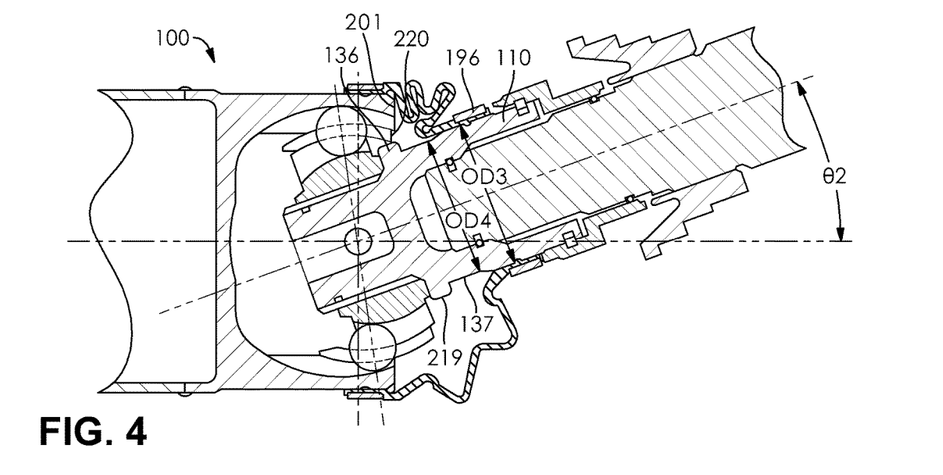
FIG. 4 is a cut-away schematic side-view of the joint illustrated in FIG. 3 at a maximum joint angle.
Figure 5:
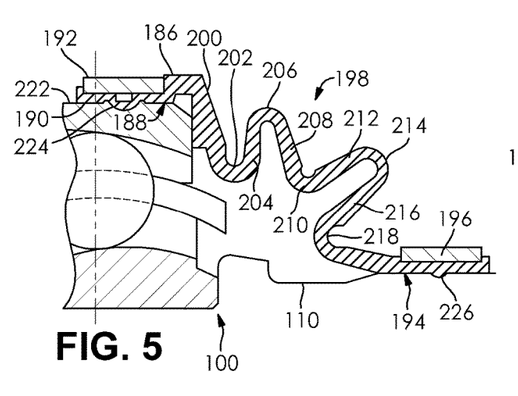
FIG. 5 is a cut-away schematic side-view of a portion of the joint illustrated in FIGS. 3 and 4 of the disclosure.

Drivingly connected to the inner race 104 is a sleeve 110 is having an axially inboard portion 112, an axially outboard portion 114 and an intermediate portion 116 that is disposed between the axially inboard portion 112 and the axially outboard portion 114 of the sleeve 110. As illustrated in FIGS. 3 and 4 of the disclosure, the sleeve 110 extends co-axially with the inner race 104 of the joint 100. According to an alternative embodiment of the disclosure, the axially inboard portion 112 of the sleeve 110 is integrally formed as part of the inner race 104 of the joint 100. The axially inboard portion 112 of the sleeve 110 has a hollow interior portion 118 opening into an open end 120 of the axially inboard portion 112. As illustrated in FIGS. 3 and 4 of the disclosure and as a non-limiting example, the hollow interior portion 118 of the sleeve 110 is substantially U-shaped.

Circumferentially extending from an outer surface 124 of the axially inboard portion 112 of the sleeve 110 is a plurality of axially extending splines 122. The plurality of splines 122 are complementary to a plurality of axially extending, circumferential splines 126 on an inner surface 128 of the inner race 104 of the joint 100. The plurality of splines 122 and 126 are meshingly engaged with one another to rotationally fix the inner race 104 and the sleeve 110 of the joint 100.

Circumferentially extending along, and disposed within the plurality of splines 126 on the inner surface 128 of the inner race 104, is an inner race snap ring groove 130. Additionally, circumferentially extending along, and disposed within the plurality of splines 122 on the outer surface 124 of the axially inboard portion 112 of the sleeve 110, is a sleeve snap ring groove 132. Disposed within the snap ring grooves 130 and 132 is a snap ring 134 that axially retains the inner race 104 of the joint 100 to the sleeve 110 of the joint 100.

The intermediate portion 116 of the sleeve 110 has an abutment portion 136 circumferentially extending from at least a portion of the intermediate portion 116 of the sleeve 110. As illustrated in FIGS. 3 and 4 of the disclosure, the axially inboard portion 112 of the sleeve 110 has an outer diameter OD1 that is smaller than an outer diameter OD2 of the abutment portion 136 of the intermediate portion 116 of the sleeve 110. Additionally, as illustrated in FIGS. 3 and 4 of the disclosure, the outer diameter OD2 of the abutment portion 136 is larger than an outer most diameter OD3 of the axially outboard portion 114 of the joint 110. In accordance with the embodiment of the disclosure illustrated in FIGS. 3 and 4 of the disclosure and as a non-limiting example, the abutment portion 136 is disposed adjacent to and is in direct contact with an end of the inner race 104 of the joint 100. It is within the scope of this disclosure that the abutment portion 136 of the sleeve 110 is hardened and/or heat-treated to increase the overall life and durability of the sleeve 110. As a non-limiting example, the abutment portion 136 of the sleeve 110 is hardened and/or heat-treated by using one or more carburizing and/or induction hardening processes.

A stepped portion 137 is disposed axially outboard from and adjacent to the abutment portion 136 of the intermediate portion 116 of the sleeve 110 of the joint 100. As illustrated in FIGS. 3 and 4 of the disclosure, the stepped portion 137 of the sleeve 110 has an outer diameter OD4 that is smaller than the outer diameter OD2 of the abutment portion 136 of the sleeve 110. Additionally, as illustrated in FIGS. 3 and 4 of the disclosure, the outer diameter OD4 of the stepped portion 137 of the sleeve 110 of the joint 100 is smaller than the outer most diameter OD3 of the axially outboard portion 114 of the sleeve 110. Furthermore, as illustrated in FIGS. 3 and 4 of the disclosure, the outer diameter OD4 of the stepped portion 137 of the sleeve 110 is larger than the outer diameter OD1 of the axially inboard portion 112 of the sleeve 110. According to an embodiment of the disclosure and as a non-limiting example, the ratio between the outer diameter OD2 of the abutment portion 136 and the outer diameter OD4 of the steeped portion 137 of the sleeve 110 is approximately 1.1-1.3. Additionally, according to an embodiment of the disclosure and as a non-limiting example, the ratio between the outer diameter OD2 of the abutment portion 136 and the outermost diameter OD3 of the axially outboard portion 114 of the sleeve 110 is approximately 1.03-1.20.

The axially outboard portion 114 of the sleeve 110 has an interior portion 138 that is substantially U-shaped with a hollow interior. An inner surface 139 of the interior portion 138 of the axially outboard portion 114 of the sleeve 110 has an interior portion snap ring groove 140. Disposed axially outboard from the interior portion snap ring groove 140, in the inner surface 139 of the interior portion 138 of the sleeve 110, is a plurality of axially extending circumferential splines 142.

As illustrated in FIGS. 3 and 4 of the disclosure, a sleeve O-ring groove 146 circumferentially extends along at least a portion of an outer surface 144 of the axially outboard portion 114 of the sleeve 110. Circumferentially extending along the outer surface 144 of the axially outboard portion 114 of the sleeve 110 is a snap ring groove 148. The sleeve outer surface snap ring groove 148 is disposed adjacent to and axially outboard from the sleeve O-ring groove 146.

Disposed at least partially axially outboard from the sleeve 110 is a nut 150 having a first inner surface 152 and a second inner surface 154. As illustrated in FIGS. 3 and 4 of the disclosure, the nut 150 extends co-axially with the sleeve 110 and the inner race 104 of the joint 100. At least a portion of the first inner surface 152 of the nut 150 radially overlaps the axially outboard portion 114 of the sleeve 110. Circumferentially extending along the first inner surface 152 of the nut 150 is a nut O-ring groove 156. Disposed within the O-ring groove 146 in the outer surface 144 of the axially outboard portion 114 of the sleeve 110 and within the nut O-ring groove 156 in the first inner surface 152 of the nut 150 is an O-ring 160. The O-ring 160 creates a seal between the nut 150 and the sleeve 110 of the joint 100.

Circumferentially extending along the first inner surface 152 of the nut 150 is a nut snap ring groove 158. As illustrated in FIGS. 3 and 4 of the disclosure and as a non-limiting example, the nut snap ring groove 158 is disposed axially outboard from and adjacent to the nut O-ring groove 156 in the first inner surface 152 of the nut 150. Disposed within the nut snap ring groove 158 in the first inner surface 152 of the nut 150 and within the sleeve outer surface snap ring groove 148 of the sleeve 110 is a snap ring 162. The snap ring 162 axially retains the nut 150 and the sleeve 110 of the joint 100 together.

As illustrated in FIGS. 3 and 4 of the disclosure, the second inner surface 154 of the nut 150 has a diameter that is smaller than the diameter of the first inner surface 152 of the nut 150. Extending from the second inner surface 154 of the nut 150 is a plurality of axially extending circumferential threads 164. The plurality of threads 164 on the second inner surface 154 of the nut 150 meshingly engage with a complementary first plurality axially extending circumferential threads 166 on an outer surface 167 of a pinion shaft 168.

The pinion shaft 168 extends co-axially with the nut 150, the sleeve 110 and the inner race 104 of the joint 100. Circumferentially extending along the second inner surface 154 of the nut 150 is an O-ring groove 170 that is complementary to an O-ring groove 172 circumferentially extending along the outer surface 167 of the pinion shaft 168. Disposed within the O-ring groove 170 in the second inner surface 154 of the nut 150 and within the O-ring groove 172 on the outer surface 167 of the pinion shaft 168 is an O-ring 174. The O-ring 174 creates a seal between the nut 150 and the pinion shaft 168 of the joint 100. In accordance with an embodiment of the disclosure, the O-ring groove 170 in the second inner surface 154 of the nut 150 is located within the plurality of threads 164 on the second inner surface 154 of the nut 150. Additionally, in accordance with this embodiment of the disclosure, the O-ring groove 172 on the outer surface 167 of the pinion shaft 168 is located within the first plurality of threads 166 on the outer surface 167 of the pinion shaft 168.

Disposed axially inboard from the first plurality of threads 166 on the outer surface 167 of the pinion shaft 168 is a plurality of axially extending circumferential splines 169 that are complementary to and meshingly engaged with the plurality of splines 142 on the interior portion 138 of the sleeve 110. As illustrated in FIGS. 3 and 4 of the disclosure, the plurality of splines 169 on the outer surface 167 of the pinion shaft 168 circumferentially and axially extend along the outer surface 167 of the pinion shaft 168 of the joint 100.

Axially inboard from the plurality of splines 169 and the first plurality of threads 166 on the outer surface 167 of the pinion shaft 168 is a pinion shaft snap ring groove 171 that is complementary to the interior portion snap ring groove 140 in the interior portion 138 of the sleeve 110. As illustrated in FIGS. 3 and 4 of the disclosure, the pinion shaft snap ring groove 171 circumferentially extends along the outer surface 167 of the pinion shaft 168. Disposed within the interior portion snap ring groove 140 in the interior portion 138 of the sleeve 110 and the snap ring groove 171 on the outer surface 167 of the pinion shaft 168 is a snap ring 173. The snap ring 171 axially retains the sleeve 110 and the pinion shaft 168 of the joint 100 together.

As illustrated in FIGS. 3 and 4 of the disclosure, the nut 150 is at least partially disposed between the sleeve 110 and a lock nut 176. Additionally, as illustrated in FIGS. 3 and 4 of the disclosure, the lock nut 176 extends co-axially with the pinion shaft 168, the nut 150, the sleeve 110 and the inner race 104 of the joint 100. The lock nut 176 has an inner surface 178 with a plurality of axially extending circumferential threads 180. The plurality of threads 180 on the inner surface 178 of the lock nut 176 meshingly engage with a complementary second plurality of axially extending circumferential threads 182 on the outer surface 167 of the pinion shaft 168. The plurality of threads 180, 182 rotationally fixes the lock nut 176 with the pinion shaft 168.

The joint 100 further includes a boot 186. The boot 186 is constructed of a flexible resilient material, such as but not limited to a thermoplastic material, a rubber material and/or a similar elastomeric material. The thermoplastic materials are able to withstand the amount of heat and pressure generated by the joint 100 during operation, as well as the various environmental conditions the boot 186 is exposed to.

The boot 186 encloses and seals the joint 100 from the environment and helps to prevent lubricant (not shown) from escaping the joint 100. As illustrated in FIGS. 3-6 of the disclosure, a first end portion 188 of the boot 186 is connected to an outer surface 190 of the outer race 102 of the joint 100. According to an embodiment of the disclosure and as a non-limiting example, the first end portion 188 of the boot 186 is connected to the outer surface 190 by using a boot clamp 192. The boot 186 disclosed herein does not require the use of a boot can (not shown) in order to connect the boot 186 to the outer race 102 of the joint 100. As a result, the boot 186 disclosed herein is able to be directly connected to the outer surface 190 of the outer race 102 of the joint 100 without any intervening structures.

The boot 186 has a second end portion 194 that is connected to the outer surface 144 of the axially outboard portion 114 of the sleeve 110. As illustrated in FIGS. 3 and 4 of the disclosure, the second end portion 194 of the boot 186 is connected to the outer surface 144 of the sleeve 110 at a location axially outboard from the stepped portion 137 of the sleeve 110. In accordance with an embodiment of the disclosure and as a non-limiting example, the second end portion 194 of the boot 186 may be secured to the sleeve 110 using a boot clamp 196.

Disposed between the first end portion 188 and the second end portion 194 of the boot 186 is an intermediate portion 198 of the boot 186. According to an embodiment of the disclosure, the boot 186 is a continuous, unitary and one-piece from the first end portion 188, through the intermediate portion 198 and to the second end portion 194 of the boot 186.

The intermediate portion 198 of the boot 186 includes at least one boot cycle. A boot cycle comprises one trough and one crest. As illustrated in FIGS. 3-6 of the disclosure, the intermediate portion 198 of the boot 186 has a first boot cycle, a second boot cycle and a half boot cycle. In accordance with the embodiment of the disclosure illustrated in FIGS. 3-6, the first boot cycle includes a first radially inward extending boot leg 200 that is connected to the first end portion 188 of the boot 186. As illustrated in FIGS. 3-6 of the disclosure, at least a portion of the first radially inward extending boot leg 200 of the boot 186 is in direct contact with a substantially vertical surface 201 of an axially inboard end portion 222 of the outer race 102. The end of the first radially inward extending boot leg 200 opposite the first end portion 188 of the boot 186 transitions to a first trough 202. A first radially outward extending boot leg 204 is connected to an end of the first trough 202 opposite the first radially inward extending boot leg 200. As illustrated in FIGS. 3-6 of the disclosure, the first radially outward extending boot leg 204 transitions to a first crest 206.

The second boot cycle includes a second radially inward extending boot leg 208 that is connected to an end of the first crest 206 opposite the first radially outward extending boot leg 204. The second radially inward extending boot leg 208 transitions to a second trough 210. A second radially outward extending boot leg 212 is connected to an end of the second trough 210 opposite the second radially inward extending boot leg 208. The second radially outward extending boot leg 212 transitions to a second crest 214.

As illustrated in FIGS. 3-6 of the disclosure, the half boot cycle includes a third radially inward extending boot leg 216 is connected to an end of the second crest 214 opposite the second radially outward extending boot leg 212 of the boot 186. The third radially inward extending boot leg 216 transitions to a third trough 218. An end of the third trough 218 opposite the third radially inward extending boot leg 216 is connected to the second end portion 194 of the boot 186. Additionally, as illustrated in FIGS. 3-6 of the disclosure, the first trough 202 opens in a substantially radial direction, the second trough 210 opens in a substantially radial direction and the third trough 218 opens in a substantially axial direction.

The boot cycles add robustness and strength to the overall structure of the boot 186. This increase in the robustness and strength in the boot 186 is necessary for the boot 186 to survive the changing lubricant and air pressures within the joint 100 when in operation. The boot cycles provide the boot 186 with sufficient strength so that the boot 186 can withstand the above-mentioned pressures without the need for a system to vent the air and/or lubricant pressure from the joint 100. Additionally, the increase in robustness and strength in the boot 186 helps ensure that the boot 186 will survive the various environmental conditions the boot 186 will experience when in operation. As a result, the boot cycles increase the overall life and durability of the boot 186.

According to an alternative embodiment of the disclosure, the axially inboard end portion 222 of the outer race 102 of the joint 100 includes a boot attachment channel 224. As illustrated in FIGS. 3-6 of the disclosure, the boot attachment channel 224 circumferentially extends along at least a portion of the outer surface 190 of the outer race 102 of the joint 100. In accordance with this with embodiment of the disclosure, when the boot clamp 192 is tightened, at least a portion of the first end portion 188 of the boot 186 is forced into at least a portion of the boot attachment channel 224. The boot attachment channel 224 helps to ensure that the first end portion 188 of the boot 186 is sealingly engaged with the outer surface 190 of the outer race 102 of the joint 100. Additionally, the boot attachment channel 224 in the outer surface 190 of the outer race 102 of the joint 100 axially retains the boot 186 to the outer race 102 of the joint 100.

According to still another embodiment of the disclosure, the outer surface 144 of the axially outboard portion 114 of the sleeve 110 includes a boot attachment channel 226. As illustrated in FIGS. 3-6 of the disclosure, the boot attachment channel 226 circumferentially extends along at least a portion of the outer surface 144 of the axially outboard portion 114 of the sleeve 110 of the joint 100. In accordance with this with embodiment of the disclosure, when the boot clamp 196 is tightened, at least a portion of the second end portion 194 of the boot 186 is forced into at least a portion of the boot attachment channel 226. The boot attachment channel 226 helps to ensure that the second end portion 194 of the boot 186 is sealingly engaged with the outer surface 144 of the axially outboard portion 114 of the sleeve 110. Additionally, the boot attachment channel 224 in the outer surface 144 of the axially outboard portion 114 of the sleeve axially retains the boot 186 to the sleeve 110 of the joint 100.

Figure 6:
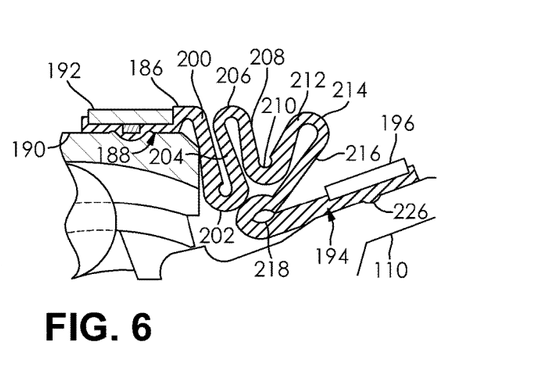
FIG. 6 is a cut-away schematic side-view of a portion of the joint illustrated in FIGS. 3-5 at a maximum joint angle.

As illustrated in FIGS. 4 and 6 of the disclosure, the joint 100 is articulated to a maximum joint angle $\theta 2$. The maximum joint angle $\theta 2$ is determined, in part, by the size and shape of the boot clamp 196, the thickness of the boot 186, the shape of the cycles when the boot 186 is compressed and the outer diameter OD2 of the abutment portion 136 of the sleeve 110. Compared to the prior art boot 16 previously discussed, the boot 186 disclosed herein has a maximum joint angle $\theta 2$ is greater than maximum joint angle $\theta 1$ of the prior art boot 16.

Additionally, when the joint 100 is articulated to the maximum joint angle θ2, a contact surface 219 of the abutment portion 136 on the intermediate portion 116 of the sleeve 110 is in direct contact with at least a portion of the cage 108 of the joint 100. As illustrated in FIGS. 4 and 6 of the disclosure, when the joint 100 is articulated to the maximum joint angle θ2, at least a portion of the contact surface 219 of the abutment portion 136 of the sleeve 110 is in direct contact with an opening inner diameter 220 of an axially outermost edge 228 of the cage 108. As a result, the abutment portion 136 of the sleeve 110 acts as a stopper to prevent the joint 100 from being articulated beyond the maximum joint angle θ2 thereby preventing the boot 186 from being over compressed and increasing the overall life and durability of the boot 186. Additionally, when the joint 100 is articulated to the maximum joint angle θ2, the stepped portion 137 provides the additional space necessary to ensure that the intermediate portion 198 of the boot 186 does not contact with the sleeve 110 thereby increasing the overall life and durability of the boot 186.

As illustrated in FIGS. 4 and 6 of the disclosure, when the joint 100 is articulated to the maximum joint angle θ2, the first trough 202 of the boot 186 is in direct contact with the third trough 218 of the boot 186. Additionally, when the joint 100 is articulated at the maximum joint angle θ2 the second trough 210 is located radially outboard from the first trough 202 and the third trough 218 of the boot 186.

Figure 7:
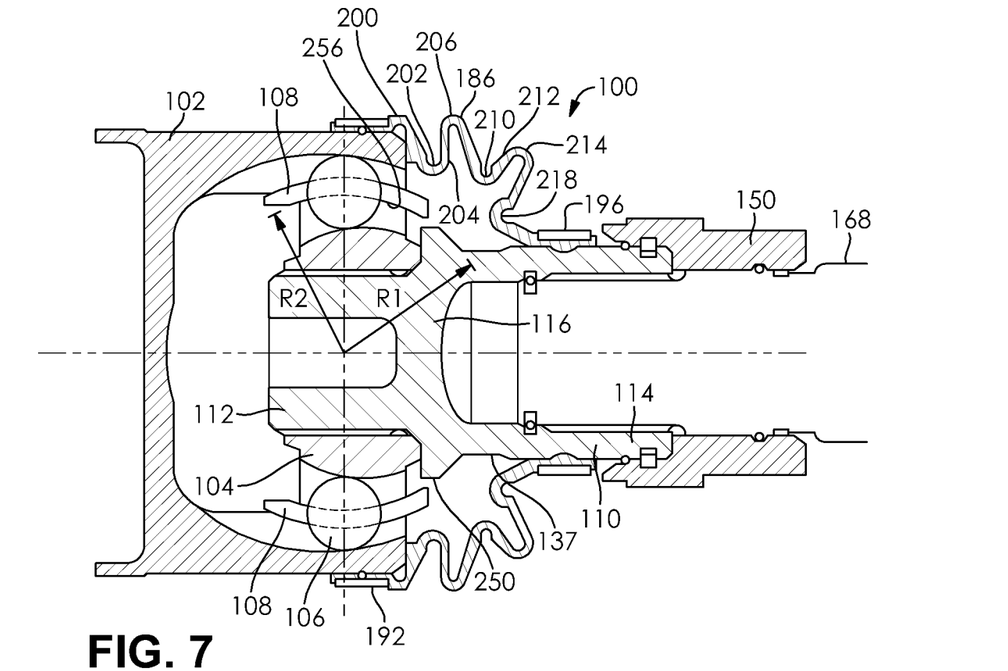
FIG. 7 is a cut-away schematic side-view of the joint illustrated in FIGS. 3-6 having a sleeve according to an alternative embodiment of the disclosure.
Figure 8:
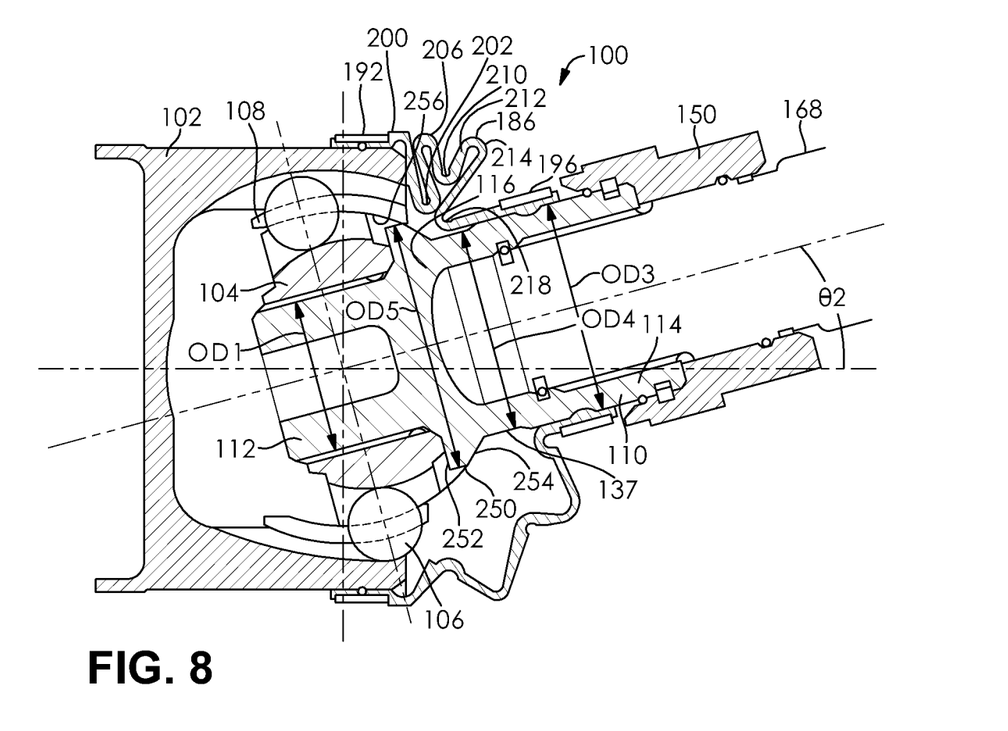
FIG. 8 is a cur-away schematic side-view of the joint having the sleeve illustrated in FIG. 7 at a maximum joint angle.

FIGS. 7 and 8 are a cut-away schematic side-view of the joint illustrated in FIGS. 3-6 having a sleeve according to an alternative embodiment of the disclosure. The joint 100 illustrated in FIGS. 3-6 of the disclosure is the same as the joint 100 illustrated in FIGS. 7-8, except where specifically noted below. As illustrated in FIGS. 7 and 8 of the disclosure, the intermediate portion 116 of the sleeve 110 of the joint 100 has an abutment portion 250 according to an alternative embodiment of the disclosure. In accordance with this embodiment of the disclosure, the abutment portion 136 illustrated in FIGS. 3-6 is replaced with the abutment portion 250. The abutment portion 250 circumferentially extends from at least a portion of the intermediate portion 116 of the sleeve 110. As illustrated in FIGS. 7 and 8 of the disclosure, the abutment portion 250 has an axially inboard side 252 and an axially outboard side 254. At least a portion of the axially inboard side 252 of the abutment portion 250 of the sleeve 110 in direct contact with an end of the inner race 104 of the joint 100. According to an embodiment of the disclosure and as a non-limiting example, the axially inboard side 252 of the abutment portion 250 of the sleeve 110 is substantially vertical.

As illustrated in FIGS. 7 and 8 of the disclosure, the axially outboard side 254 of the abutment portion 150 of the sleeve 110 is substantially arcuate in shape. According to this embodiment of the disclosure, the axially outboard side 254 has a radius R1 that is complementary to a radius R2 of an inner surface 256 of the cage 108 of the joint 100. When the joint 100 is articulated to the maximum joint angle θ2 illustrated in FIG. 8 of the disclosure, at least a portion of the axially outboard side 254 of the abutment portion 250 is in direct contact with at least a portion of the inner surface 256 of the cage 108. As a result, when the axially outboard side 254 of the abutment portion 250 contacts the inner surface 256 of the cage 106, the abutment portion 250 acts as a stopper to prevent the joint 100 from being articulated beyond the maximum joint angle θ2. This aids in preventing the boot 186 from being over compressed, which increases the overall life and durability of the boot 186.

The stepped portion 137 of the sleeve 110 is disposed adjacent to and axially outboard from the abutment portion 250 of the sleeve 110. As illustrated in FIGS. 7 and 8 of the disclosure, an end of the axially outboard side 254 of the abutment portion 150 of the sleeve 110 transitions into the stepped portion 137 of the sleeve 110.

In accordance with the embodiment of the disclosure the illustrated in FIGS. 7 and 8, the abutment portion 250 of the sleeve 110 has an outer diameter OD5 that is larger than the outer diameter OD1 of the axially inboard portion 112 of the sleeve 110. Additionally, as illustrated in FIGS. 7 and 8 of the disclosure, the outer diameter OD5 of the abutment portion 250 of the sleeve 110 is larger than the outer diameter OD4 of the stepped portion 137 and the outermost diameter OD3 of the axially outboard portion 114 of the sleeve 110. Furthermore, as illustrated in FIGS. 7 and 8 of the disclosure, the outer diameter OD4 of the stepped portion 137 of the sleeve 110 is smaller than the outermost diameter OD3 of the axially outboard portion 114 of the sleeve 110 but is larger than the outer diameter OD1 of the axially inboard portion 112 of the sleeve 110. According to an embodiment of the disclosure and as a non-limiting example, the ratio between the outer diameter OD5 of the abutment portion 250 and the outer diameter OD4 of the steeped portion 137 of the sleeve 110 is approximately 1.1-1.3. Additionally, according to an embodiment of the disclosure and as a non-limiting example, the ratio between the outer diameter OD5 of the abutment portion 250 and the outermost diameter OD3 of the axially outboard portion 114 of the sleeve 110 is approximately 1.03-1.20.

It is within the scope of this disclosure that the abutment portion 250 of the sleeve 110 is hardened and/or heat-treated to increase the overall life and durability of the sleeve 110. As a non-limiting example, the abutment portion 250 of the sleeve 110 is hardened and/or heat-treated by using one or more carburizing and/or induction hardening processes.

Figure 9:
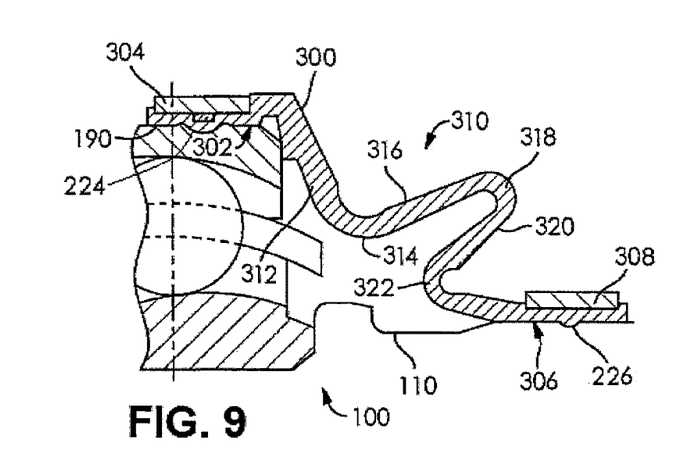
FIG. 9 is a cut-away schematic side-view of a portion of the joint illustrated in FIGS. 3-6 of the disclosure having a boot according to an alternative embodiment of the disclosure.

FIG. 9 is a cut-away schematic side-view of a portion of the joint 100 illustrated in FIGS. 3-6 of the disclosure having a boot 300 according to an alternative embodiment of the disclosure. The joint 100 illustrated in FIGS. 3-6 of the disclosure is the same as the joint 100 illustrated in FIG. 9, except where specifically noted below. As illustrated in FIG. 9 of the disclosure, the boot 300 has a first end portion 302 that is connected to the outer surface 190 of the outer race 102 of the joint 100. As a non-limiting example, the first end portion 302 may be secured to the outer surface 190 of the outer race 102 by using a boot clamp 304. The joint 100 disclosed herein does not utilize a boot can in order to connect the boot 300 to the outer race 102 of the joint 100. Instead, the boot 300 disclosed herein is directly connected to the outer surface 190 of the outer race 102 of the joint 100 without any intervening structures.

As illustrated in FIG. 9 of the disclosure, the boot 300 has a second end portion 306 that is connected to the outer surface 144 of the sleeve 110. As a non-limiting example, the second end portion 306 may be connected to the sleeve 110 by using a boot clamp 308.

Interposed between the first end portion 302 and the second end portion 306 of the boot 300 is an intermediate portion 310. According to an embodiment of the disclosure, the boot 300 is a continuous, unitary and one-piece from the first end portion 302, through the intermediate portion 310 and to the second end portion 306 of the boot 300.

The intermediate portion 310 includes at least one boot cycle. A boot cycle comprises of one trough and one crest. As illustrated in FIG. 9 of the disclosure, the intermediate portion 310 of the boot 300 has a first boot cycle and a half boot cycle. In accordance with the embodiment of the disclosure illustrated in FIG. 9 of the disclosure, the first boot cycle includes a first radially inward extending boot leg 312 that is connected to the first end portion 302 of the boot 300. As illustrated in FIG. 9 of the disclosure, at least a portion of the first radially inward extending boot leg 312 of the boot 300 is in direct contact with the substantially vertical surface 201 of the axially inboard end portion 222 of the outer race 102. An end of the first radially inward extending leg 312 opposite the first end portion 302 of the boot 300 transitions to a first trough 314. A first radially outward extending boot leg 316 is connected to an end of the first trough 314 opposite the first radially inward extending boot leg 312 of the boot 300. The first radially outward extending boot leg 316 transitions to a first crest 318.

The half boot cycle includes a second radially inward extending boot leg 320 connected to an end of the first crest 318 opposite the first radially outward extending boot leg 316. The second radially inward extending boot leg 320 transitions to a second trough 322. An end of the second trough 322 opposite the second radially inward extending boot leg 320 is connected to the second end portion 306 of the boot 300.

As illustrated in FIG. 9 of the disclosure, the first trough 314 of the boot 300 opens in a substantially radial direction and the second trough 322 opens in a substantially axial direction.

Figure 10:
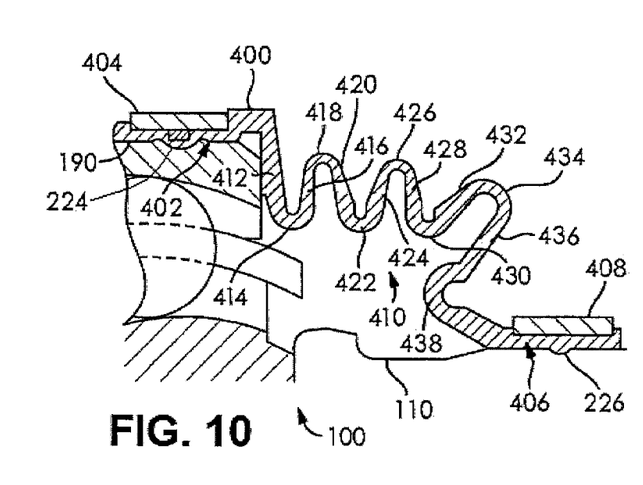
FIG. 10 is a cut-away schematic side-view of a portion of the joint illustrated in FIGS. 3-6 and 9 of the disclosure having a boot according to another alternative embodiment of the disclosure.

FIG. 10 is a cut-away schematic side-view of a portion of the joint 100 illustrated in FIGS. 3-6 and 9 of the disclosure having a boot 400 according to another alternative embodiment of the disclosure. The joint 100 illustrated in FIGS. 3-6 and 9 of the disclosure is the same as the joint 100 illustrated in FIG. 10, except where specifically noted below. As illustrated in FIG. 10 of the disclosure, the boot 400 has a first end portion 402 that is connected to the outer surface 190 of the outer race 102 of the joint 100. As a non-limiting example, the first end portion 402 of the boot 400 may be connected to the outer surface 190 of the outer race 102 of the joint 100 by using a boot clamp 404. The joint 100 disclosed herein does not utilize a boot can in order to connect the boot 400 to the outer race 102 of the joint 100. Instead, the boot 400 disclosed herein is directly connected to the outer race 102 of the joint 100 without any intervening structures.

The boot 400 has a second end portion 406 that is connected to the outer surface 144 of the sleeve 110. As a non-limiting example, the second end portion 406 of the boot 400 may be connected to the outer surface 144 of the sleeve 110 by using a boot clamp 408.

Interposed between the first end portion 402 and the second end portion 406 of the boot 400 is an intermediate portion 410. According to an embodiment of the disclosure, the boot 400 is a continuous, unitary and one-piece from the first end portion 402, through the intermediate portion 410 and to the second end portion 406 of the boot 400.

The intermediate portion 410 of the boot 400 includes at least one boot cycle. A boot cycle comprises of one trough and one crest. As illustrated in FIG. 10 of the disclosure, the intermediate portion 410 of the boot 400 includes a first boot cycle, a second boot cycle, a third boot cycle and a half boot cycle. In accordance with the embodiment of the disclosure illustrated in FIG. 10, the first boot cycle includes a first radially inward extending boot leg 412 that is connected to the first end portion 402 of the boot 400. As illustrated in FIG. 10 of the disclosure, at least a portion of the first radially inward extending boot leg 412 of the boot 400 is in direct contact with the substantially vertical surface 201 of the axially inboard end portion 222 of the outer race 102. An end of the first radially inward extending boot leg 412 opposite the first end portion 402 of the boot 400 transitions to a first trough 414. A first radially outward extending boot leg 416 is connected to an end of the first trough 414 opposite the first radially inward extending boot leg 412. The first radially outward extending boot leg 416 transitions to a first crest 418.

The second boot cycle includes a second radially inward extending boot leg 420 that is connected an end of the first crest 418 opposite the first radially outward extending boot leg 416. The second radially inward extending leg 420 transitions to a second trough 422. A second radially outward extending boot leg 424 is connected to an end of the second trough 422 opposite the second radially inward extending boot leg 420. The second radially outward extending boot leg 424 transitions to a second crest 426.

As illustrated in FIG. 10 of the disclosure, the third boot cycle includes a third radially inward extending boot leg 428 that is connected to an end of the second crest 426 opposite the second radially outward extending boot leg 424. The third radially inward extending boot leg 428 transitions to a third trough 430. A third radially outward extending boot leg 432 is connected to an end of the third trough 430 opposite the third radially inward extending boot leg 428. The third radially outward extending boot leg 432 transitions to a third crest 434.

The half boot cycle includes a fourth radially inward extending boot leg 436 that is connected to an end of the third crest 434 opposite the third radially outward extending boot leg 432. The fourth radially inward extending boot leg 436 transitions to a fourth trough 438. An end of the fourth trough 438 opposite the fourth radially inward extending boot leg 436 is connected to the second end portion 406 of the boot 400.

As illustrated in FIG. 10 of the disclosure, the first trough 414 opens in a substantially radial direction, the second trough 422 opens in a substantially radial direction, the third trough 430 opens in a substantially radial direction and the fourth trough 438 opens in a substantially axial direction.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed:
1. A joint assembly, comprising:
 a joint comprising an inner race, an outer race, a plurality of balls and a cage that is disposed between said inner race and said outer race of said joint;
  wherein said inner race of said joint has an inner surface and an outer surface;
  wherein said inner surface of said inner race of said joint has a plurality of axially extending splines circumferentially extending along at least a portion of said inner surface of said inner race;
 a sleeve having an axially inboard portion, an axially outboard portion and an intermediate portion disposed between said axially inboard portion and said axially outboard portion of said sleeve;
  wherein at least a portion of said axially inboard portion of said sleeve has a plurality of axially extending splines circumferentially extending along at least a portion of an outer surface of said axially inboard portion of said sleeve;

wherein said plurality of axially extending splines on said outer surface of said axially inboard portion of said sleeve are complementary to and meshingly engaged with said plurality of axially extending splines on said inner surface of said inner race;

wherein at least a portion of said intermediate portion of said sleeve has an abutment portion circumferentially extending from at least a portion of said intermediate portion of said sleeve;

wherein at least a portion of said abutment portion on said intermediate portion of said sleeve is in direct contact with an end of said inner race;

wherein said abutment portion of said intermediate portion of said sleeve has an outer diameter defining a contact surface;

wherein said contact surface of said abutment portion of said sleeve is in direct contact with at least a portion of said cage when said joint is articulated to a maximum joint angle;

a boot having a first end portion, a second end portion and an intermediate portion that is disposed between said first end portion and said second end portion of said boot;

wherein said first end portion of said boot is connected to an outer surface of said outer race of said joint by a first boot clamp;

wherein said second end portion of said boot is connected to a portion of said outer surface of said sleeve by a second boot clamp wherein a stepped portion is disposed axially outboard from and adjacent to said abutment portion on said intermediate portion of said sleeve;

wherein said stepped portion of said sleeve has an outer diameter that is smaller than said outer diameter of said abutment portion;

wherein said axially outboard portion of said sleeve has an inner surface and an outer surface defining a hollow interior portion;

wherein said axially outboard portion of said sleeve has an outermost diameter that is larger than said outer diameter of said stepped portion;

wherein said outer most diameter of said axially outboard portion of said sleeve is smaller than said outer diameter of said abutment portion of said intermediate portion of said sleeve;

wherein said inner surface of said hollow interior portion of said axially outboard portion of said sleeve has a plurality of axially extending circumferential splines;

wherein a shaft having an outer surface extends co-axially with said sleeve and said inner race of said joint; and wherein said outer surface of said shaft comprises a plurality of axially extending circumferential splines that are complementary to said plurality of axially extending circumferential splines on said inner surface of said hollow interior portion of said axially outboard portion of said sleeve.

2. The joint assembly of claim 1, wherein said joint is a direct pinion mount constant velocity joint.

3. The joint assembly of claim 1, wherein said shaft further comprises a shaft snap ring groove circumferentially extending along said outer surface of said shaft;

wherein said shaft snap ring groove is disposed axially inboard from said plurality of axially extending circumferential splines on said outer surface of said shaft;

wherein said inner surface of said hollow interior portion of said axially outboard portion of said sleeve further comprises an interior portion snap ring groove circumferentially extending along said inner surface hollow interior portion of said sleeve; and wherein a snap ring is disposed within said shaft snap ring groove and within said interior portion snap ring groove.

4. The joint assembly of claim 3, further comprising a nut;

wherein said nut comprises a first inner surface and a second inner surface;

wherein at least a portion of said first inner surface of said nut radially overlaps at least a portion of said axially outboard portion of said sleeve;

wherein said first inner surface of said nut comprises a nut snap ring groove;

wherein said nut snap ring groove circumferentially extends along said first inner surface of said nut;

wherein said outer surface of said axially outboard portion of said sleeve comprises a sleeve outer surface snap ring groove;

wherein said sleeve outer surface snap ring groove circumferentially extends along said outer surface of said axially outboard portion of said sleeve;

wherein a snap ring is disposed within said sleeve outer surface snap ring groove and within said nut snap ring groove;

wherein a plurality of axially extending circumferential threads extend from said second inner surface of said nut;

wherein said shaft further comprises a first plurality of axially extending circumferential threads;

wherein said first plurality of axially extending threads extend from said outer surface of said shaft;

wherein said first plurality of threads on said outer surface of said shaft are disposed axially outboard from and adjacent to said plurality of splines on said outer surface of said shaft; and wherein said first plurality of threads on said outer surface of said shaft are complementary to and meshingly engaged with said plurality of threads on said second inner surface of said nut.

5. The joint assembly of claim 4, further comprising a lock nut;

wherein said lock nut is disposed axially outboard from and adjacent to said nut;

wherein said lock nut comprises an inner surface;

wherein said inner surface of said nut has a plurality of axially extending circumferential threads;

wherein said outer surface of said shaft further comprises a second plurality of axially extending circumferential threads that are complementary to and meshingly engaged with said plurality of axially extending circumferential threads on said inner surface of said lock nut; and wherein said second plurality of axially extending circumferential threads on said outer surface of said shaft are disposed axially outboard from and adjacent to said first plurality of axially extending circumferential threads on said outer surface of said shaft.

6. The joint assembly of claim 1, wherein said abutment portion of said sleeve is heat-treated by carburizing and/or induction hardening.

7. The joint assembly of claim 1, wherein said axially inboard portion of said sleeve further comprises a sleeve snap ring groove;

wherein said sleeve snap ring groove circumferentially extends along said plurality of splines on said outer surface of said axially inboard portion of said sleeve;
wherein said inner surface of said inner race further comprises an inner race snap ring groove;
wherein said inner race snap ring groove circumferentially extends along said plurality of splines on said inner surface of said inner race; and
wherein a snap ring is disposed within said sleeve snap ring groove and within said inner race snap ring groove.

8. The joint assembly of claim 1, wherein said boot is made of a thermoplastic material, elastomeric material and/or a rubber material.

9. The joint assembly of claim 1, wherein said intermediate portion of said boot comprises, in axial order, a first radially inward extending boot leg, a first trough, a first radially outward extending boot leg, a first crest, a second radially inward extending boot leg and a second trough;
wherein an end of said first radially inward extending boot leg opposite said first trough is connected to said first end portion of said boot; and
wherein an end of said second trough opposite said second radially inward extending boot leg is connected to said second end portion of said boot.

10. The joint assembly of claim 1, wherein said intermediate portion of said boot comprises, in axial order, a first radially inward extending boot leg, a first trough, a first radially outward extending boot leg, a first crest, a second radially inward extending boot leg, a second trough, a second radially outward extending boot leg, a second crest, a third radially inward extending boot leg, a third trough, a third radially outward extending boot leg, a third crest, a fourth radially inward extending boot leg and a fourth trough;
wherein an end of said first radially inward extending boot leg opposite said first trough is connected to said first end portion of said boot; and
wherein an end of said fourth trough opposite said fourth radially inward extending boot leg is connected to said second end portion of said boot.

11. The joint assembly of claim 1, wherein an axially inboard end portion of said outer race of said joint further comprises a boot attachment channel;
wherein said boot attachment channel circumferentially extends along at least a portion of an outer surface of said axially inboard end portion of said outer race of said joint; and
wherein at least a portion of said first end portion of said boot is disposed within said boot attachment channel in said outer surface of said outer race of said joint.

12. The joint assembly of claim 1, wherein said outer surface of said axially outboard portion of said sleeve further comprises a boot attachment channel;
wherein said boot attachment channel in said axially outboard portion of said sleeve circumferentially extends along at least a portion of said outer surface of said axially outboard portion of said sleeve; and
wherein at least a portion of said second end portion of said boot is disposed within said boot attachment channel in said outer surface of said axially outboard portion of said sleeve.

13. A joint assembly, comprising:
a joint comprising an inner race, an outer race, a plurality of balls and a cage that is disposed between said inner race and said outer race of said joint;
wherein said inner race of said joint has an inner surface and an outer surface;
wherein said inner surface of said inner race of said joint has a plurality of axially extending splines circumferentially extending along at least a portion of said inner surface of said inner race;
a sleeve having an axially inboard portion, an axially outboard portion and an intermediate portion disposed between said axially inboard portion and said axially outboard portion of said sleeve;
wherein at least a portion of said axially inboard portion of said sleeve has a plurality of axially extending splines circumferentially extending along at least a portion of an outer surface of said axially inboard portion of said sleeve;
wherein said plurality of axially extending splines on said outer surface of said axially inboard portion of said sleeve are complementary to and meshingly engaged with said plurality of axially extending splines on said inner surface of said inner race;
wherein at least a portion of said intermediate portion of said sleeve has an abutment portion circumferentially extending from at least a portion of said intermediate portion of said sleeve;
wherein said abutment portion on said intermediate portion of said sleeve has an axially inboard side and an axially outboard side;
wherein said axially inboard side of said abutment portion is substantially vertical;
wherein at least a portion of said axially inboard side of said abutment portion of said sleeve is in direct contact with an end of said inner race;
wherein said axially outboard side of said abutment portion of said sleeve is substantially arcuate in shape;
wherein said axially outboard side of said abutment portion of said sleeve has a radius R1 that is complementary to a radius R2 of an inner surface of said cage of said joint;
a boot having a first end portion, a second end portion and an intermediate portion that is disposed between said first end portion and said second end portion of said boot;
wherein said first end portion of said boot is connected to an outer surface of said outer race of said joint by a first boot clamp;
wherein said second end portion of said boot is connected to a portion of said outer surface of said sleeve by a second boot clamp
wherein a ratio between an outer diameter of said abutment portion of said sleeve and an outer diameter of a stepped portion of said sleeve is approximately 1.1 to approximately 1.3.

14. A joint assembly, comprising:
a joint comprising an inner race, an outer race, a plurality of balls and a cage that is disposed between said inner race and said outer race of said joint;
wherein said inner race of said joint has an inner surface and an outer surface;
wherein said inner surface of said inner race of said joint has a plurality of axially extending splines circumferentially extending along at least a portion of said inner surface of said inner race;
a sleeve having an axially inboard portion, an axially outboard portion and an intermediate portion disposed between said axially inboard portion and said axially outboard portion of said sleeve;

wherein at least a portion of said axially inboard portion of said sleeve has a plurality of axially extending splines circumferentially extending along at least a portion of an outer surface of said axially inboard portion of said sleeve;

wherein said plurality of axially extending splines on said outer surface of said axially inboard portion of said sleeve are complementary to and meshingly engaged with said plurality of axially extending splines on said inner surface of said inner race;

wherein at least a portion of said intermediate portion of said sleeve has an abutment portion circumferentially extending from at least a portion of said intermediate portion of said sleeve;

wherein at least a portion of said abutment portion on said intermediate portion of said sleeve is in direct contact with an end of said inner race;

wherein said abutment portion of said intermediate portion of said sleeve has an outer diameter defining a contact surface;

wherein said contact surface of said abutment portion of said sleeve is in direct contact with at least a portion of said cage when said joint is articulated to a maximum joint angle;

a boot having a first end portion, a second end portion and an intermediate portion that is disposed between said first end portion and said second end portion of said boot;

wherein said first end portion of said boot is connected to an outer surface of said outer race of said joint by a first boot clamp;

wherein said second end portion of said boot is connected to a portion of said outer surface of said sleeve by a second boot clamp;

wherein said intermediate portion of said boot comprises, in axial order, a first radially inward extending boot leg, a first trough, a first radially outward extending boot leg, a first crest, a second radially inward extending boot leg, a second trough, a second radially outward extending boot leg, a second crest, a third radially inward extending boot leg and a third trough;

wherein said first trough is in direct contact with said third trough when said joint is articulated to said maximum joint angle; and wherein said second trough is disposed radially outboard from said first trough and said third trough when said joint is articulated to said maximum joint angle.

\* \* \* \* \*